(12) United States Patent
Kaul et al.

(10) Patent No.: US 11,796,997 B1
(45) Date of Patent: Oct. 24, 2023

(54) EMERGENCY VEHICLE INTERACTIONS USING EXTERNAL TRIGGERS

(71) Applicant: GM Cruise Holdings LLC, San Francisco, CA (US)

(72) Inventors: Anuj Kaul, Santa Clara, CA (US); Kunal Roy, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 294 days.

(21) Appl. No.: 16/829,848

(22) Filed: Mar. 25, 2020

(51) Int. Cl.
*G05D 1/00* (2006.01)
*G05D 1/02* (2020.01)
*B60W 60/00* (2020.01)

(52) U.S. Cl.
CPC ....... *G05D 1/0022* (2013.01); *B60W 60/0017* (2020.02); *G05D 1/0088* (2013.01); *G05D 1/028* (2013.01); *G05D 1/0285* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,201,421 B1 * | 12/2015 | Fairfield | G06V 20/58 |
| 10,008,111 B1 * | 6/2018 | Grant | G08G 1/166 |
| 2019/0370576 A1 * | 12/2019 | Surendran | B60R 21/01538 |
| 2020/0312136 A1 * | 10/2020 | Mondello | G08G 1/017 |
| 2020/0357279 A1 * | 11/2020 | Rodriguez | G08G 1/095 |
| 2021/0027625 A1 * | 1/2021 | Jung | H04N 5/272 |

* cited by examiner

*Primary Examiner* — Jason Holloway
(74) *Attorney, Agent, or Firm* — Novak Druce Carroll LLP

(57) ABSTRACT

The subject disclosure relates to technologies for vehicle interactions with emergency vehicles. A process of the disclosed technologies can include steps for receiving a command from an emergency vehicle identifying an autonomous vehicle and initiating actions to cause the autonomous vehicle identified by the emergency vehicle to obey the command.

8 Claims, 6 Drawing Sheets

EMERGENCY VEHICLE INTERACTIONS USING EXTERNAL TRIGGERS

TECHNICAL FIELD

The subject technology provides solutions for vehicle interactions with emergency vehicles and more particularly for using external triggers to cause autonomous vehicles to respond to emergency vehicles.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When a vehicle is deployed for use, emergency vehicles, such as police vehicles, ambulances, and/or firetrucks may need to communicate with drivers of the vehicle to provide instructions. Human drivers can directly communicate with the emergency vehicles and use their judgment to follow instructions provided by the emergency vehicles. However, vehicles may not always have a human driver to receive the instructions.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

When a vehicle is deployed for use, emergency vehicles, such as police vehicles, ambulances, and/or firetrucks may need to communicate with drivers of the vehicle to provide instructions. Human drivers can directly communicate with the emergency vehicles and use their judgment to follow instructions provided by the emergency vehicles.

Autonomous vehicles lack human drivers while emergency vehicles rely on mechanisms to communicate to human drivers of their approach, or to communicate a specific desired action (i.e., a police might instruct a car to pull over via a loudspeaker, or a fire truck might play a siren to inform all traffic to make room to allow the fire truck to pass). In particular, autonomous vehicles don't have a method to override typical driving commands to pullover in response to external triggers, such as emergency vehicles. In some instances, the autonomous vehicles may be able to detect or recognize an emergency vehicle and initiate pull-over commands. However, this relies heavily on visual and audible perception, which requires intensive compute and may result in false positives and failure to properly detect emergency vehicles. This failure to detect emergency vehicles may result in danger to the public and fines.

Furthermore, autonomous vehicles are typically designed to only respond to a remote computing system for security purposes. More specifically, allowing communication between a third-party and the autonomous vehicle would potentially allow bad actors to take over the autonomous vehicle and cause potentially dangerous situations. For example, a malicious actor may attempt to take over the autonomous vehicle and cause traffic accidents. Thus, autonomous vehicles are designed to only communicate with the remote computing system to reduce ingress points for bad actors.

Thus, the disclosed technology addresses the need in the art for vehicle interactions with emergency vehicles using external triggers. Furthermore, the disclosed technologies addresses potential failures with additional redundancies to eliminate the potential failures.

Figure 1:
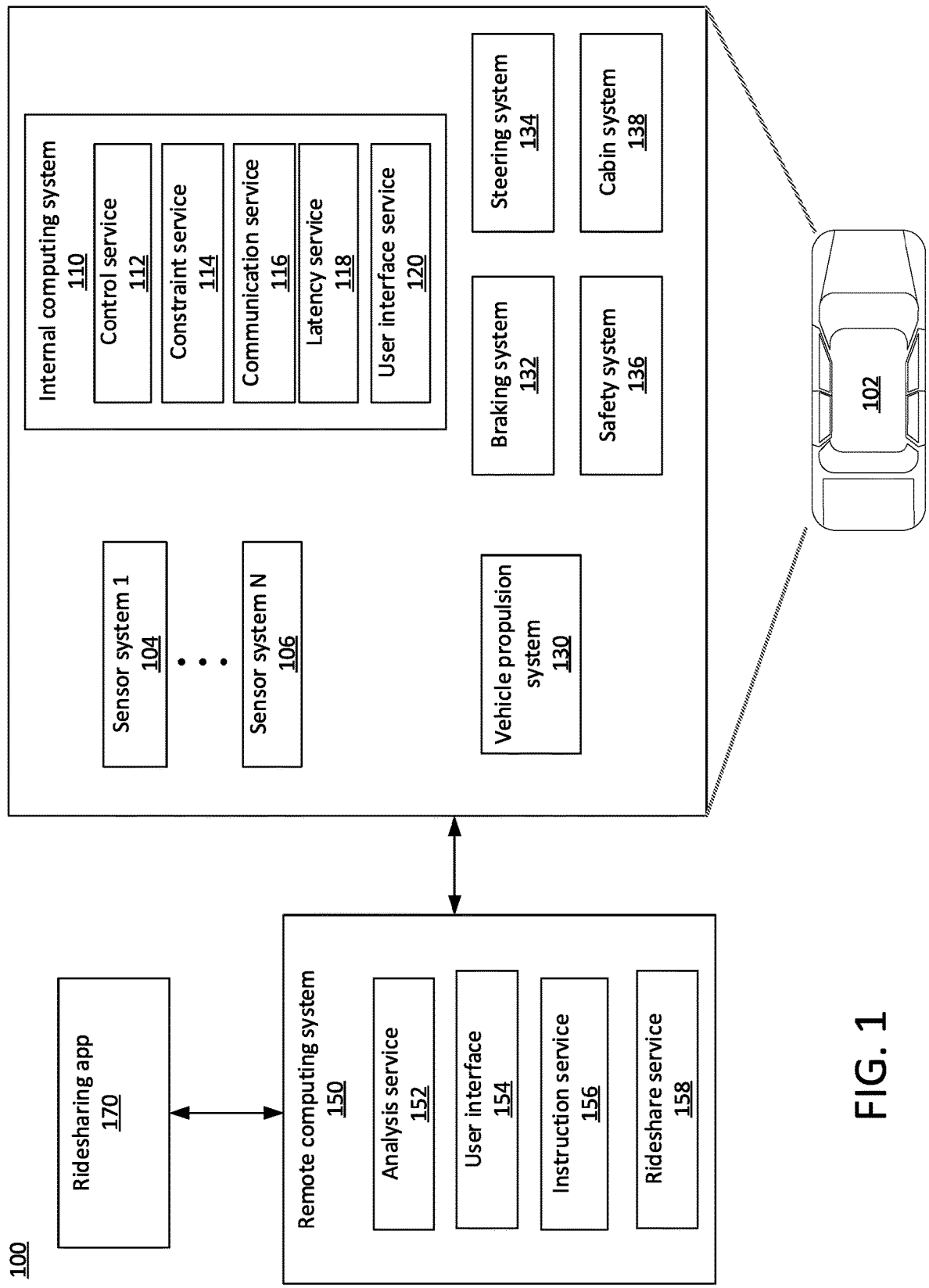
FIG. 1 shows an example system for operating an autonomous vehicle in accordance with some aspects of the present technology.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112. The control service 112 and/or the constraint service 114 may also receive information and instructions from emergency vehicles to update restrictions and/or obey the instructions from the emergency vehicles.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication. The software and hardware elements in communication service 116 may also be configured to communicate with a remote assistance advisor, such that the remote assistance advisor may transmit and receive signals from/to the autonomous vehicle 102. Similarly, the communication service 116 may also transmit and receive signals from/to emergency vehicles, such that the emergency vehicles may transmit information wirelessly to the autonomous vehicle 102.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
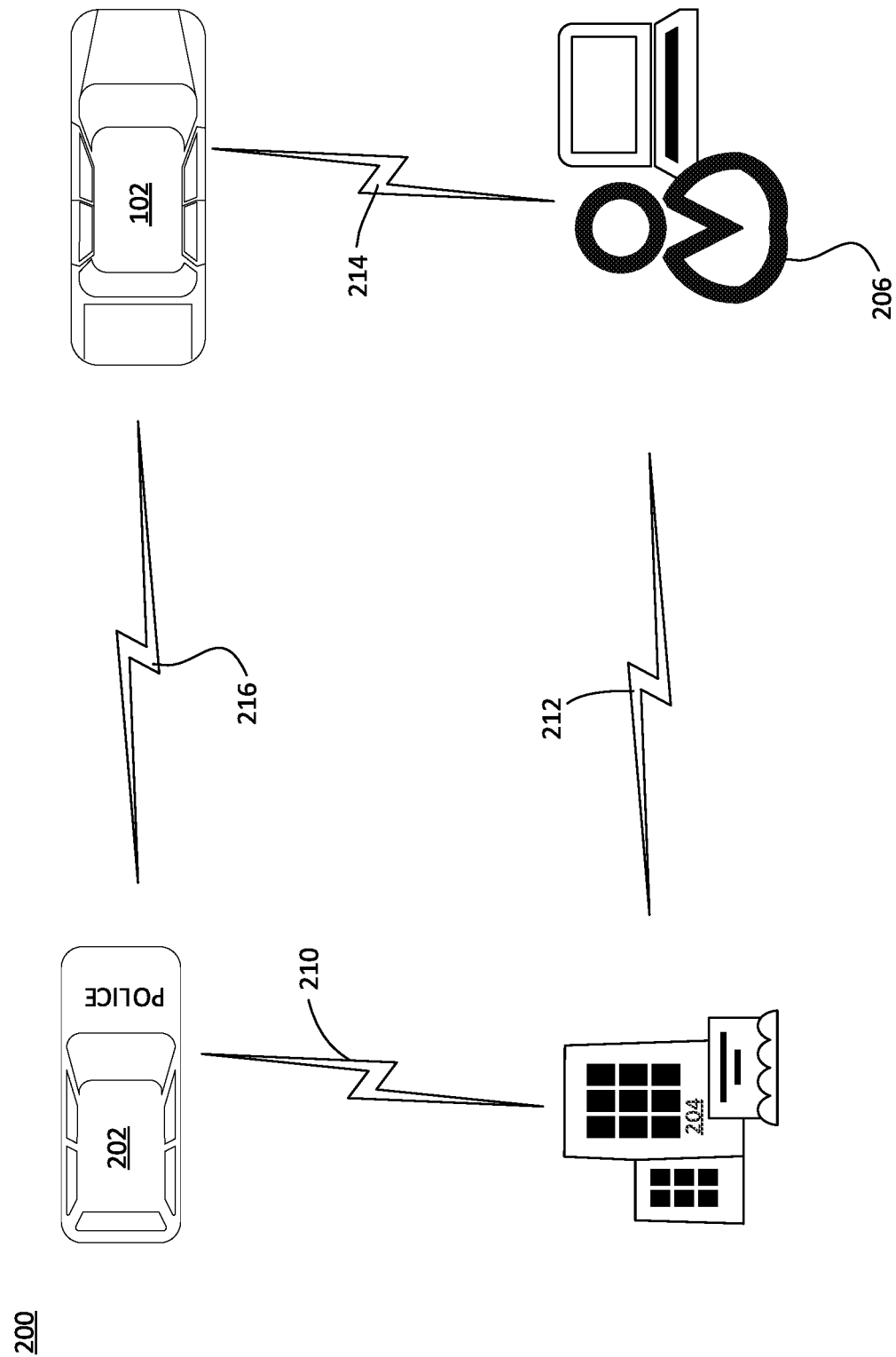
FIG. 2 shows an example environment in which an emergency vehicle communicates with an autonomous vehicle in accordance with some aspects of the present technology.

FIG. 2 shows an example environment 200, in which an emergency vehicle 202 communicates with an autonomous vehicle 102. The example environment 200 includes the emergency vehicle 202, the autonomous vehicle 102, an emergency services advisor 204, and a remote assistance advisor 206. Furthermore, the emergency vehicle 202, the autonomous vehicle 102, the emergency services advisor 204, and the remote assistance advisor 206 are configured to communicate with each other through communication links 210, 212, 214, 216. The communication links 210, 212, 214, 216 may utilize a variety of different technologies to transmit and/or receive data including, but not limited to radio frequencies, cellular technologies, etc.

In some scenarios, the emergency vehicle 202 may contact an emergency services advisor 204 via a first communication link 210. More specifically, the emergency vehicle 202 may send to the emergency services advisor 204 an identifier of the autonomous vehicle 102 and instructions for a desired action, such as to pull over or stop. The emergency services advisor 204 may then relay, via a second communication link 212, the identifier and instructions to a remote assistance advisor 206 that is associated with the autonomous vehicle 102. In some embodiments, the second communication link 212 may include an application programming interface (API) that simplifies and streamlines the communication between the emergency services advisor 204 and the remote assistance advisor 206. In some embodiments, the API may be private, such that only the emergency services advisor 204 has access to the API; thus, any requests from the API would self-authenticate the sender as a trusted emergency services advisor 204. The remote assistance advisor 206 may then interpret the instructions and determine, based upon the identifier, which autonomous vehicle 102 to send the instructions to. Thus, the remote assistance advisor 206 may then relay the instructions, via a third communication link 214, to the autonomous vehicle 102 identified. The autonomous vehicle 102 may then obey the instructions. In some embodiments, the remote assistance advisor 206 may instead directly control the autonomous vehicle 102 to obey the instructions. In some embodiments, the remote assistance advisor 206 may also send or identify, via the third communication link 214, a chain of communication between the emergency vehicle 202, the emergency services advisor 204, and the remote assistance advisor 206.

The communication links 210, 212, 214, 216 of example environment 200 further create additional redundancies in scenarios that some communication links 210, 212, 214 are disconnected. More specifically, the autonomous vehicle 102 is configured to receive commands directly from the emergency vehicle 202 and by way of relay through the emergency services advisor 204 and the remote assistance advisor 206. For example, the autonomous vehicle 102 may be in an area with low cell or LTE connectivity, such that the first communication link 210 between the emergency vehicle 202 and the emergency services advisor 206 is unavailable or unusable.

Accordingly, the emergency vehicle 202 may directly communicate with the autonomous vehicle 102 via a direct communication link 216. The direct communication link 216 may utilize various types of close-range communication including, but not limited to, Bluetooth, radio frequencies, modulated light transmission, etc. Via the direct communication link 216, the emergency vehicle 202 may send an identifier of the autonomous vehicle 102 and instructions for the autonomous vehicle 102 to perform. The autonomous vehicle 102 may then send, via the communication link 214, the identifier and the instructions to the remote assistance advisor 206 for authentication and/or permission to obey the instructions. Accordingly, the remote assistance advisor 206 may authenticate and provide permission/and/or commands for the autonomous vehicle to obey the instructions.

In some embodiments, the emergency vehicle 202 may transmit a signal directly to the autonomous vehicle 102 over the direct communication link 216. The signal may include a self-authenticating identifier, so that the autonomous vehicle 102 may determine that the signal is from a trusted source, such as an emergency vehicle. Thus, the autonomous vehicle 102 would not need to communicate with the remote assistance advisor 206 for authentication and/or permission to obey the instructions. In other words, the autonomous vehicle 102 may then automatically initiate actions to obey the instructions without confirmation from the remote assistance advisor. Similarly, the signal may be broadcasted on an emergency frequency accessible only by emergency vehicles. In some embodiments, the autonomous vehicle 102 may also be configured to allow the emergency vehicle 202 to control the autonomous vehicle 102 after receiving the authenticated signal. In some embodiments, the transmission of the signal may be broadcasted to multiple autonomous vehicles with the identifier of the autonomous vehicle 102. Thus, only the intended autonomous vehicle 102 may respond to the signal after determining that the identifier matches the intended autonomous vehicle 102.

Figure 3:
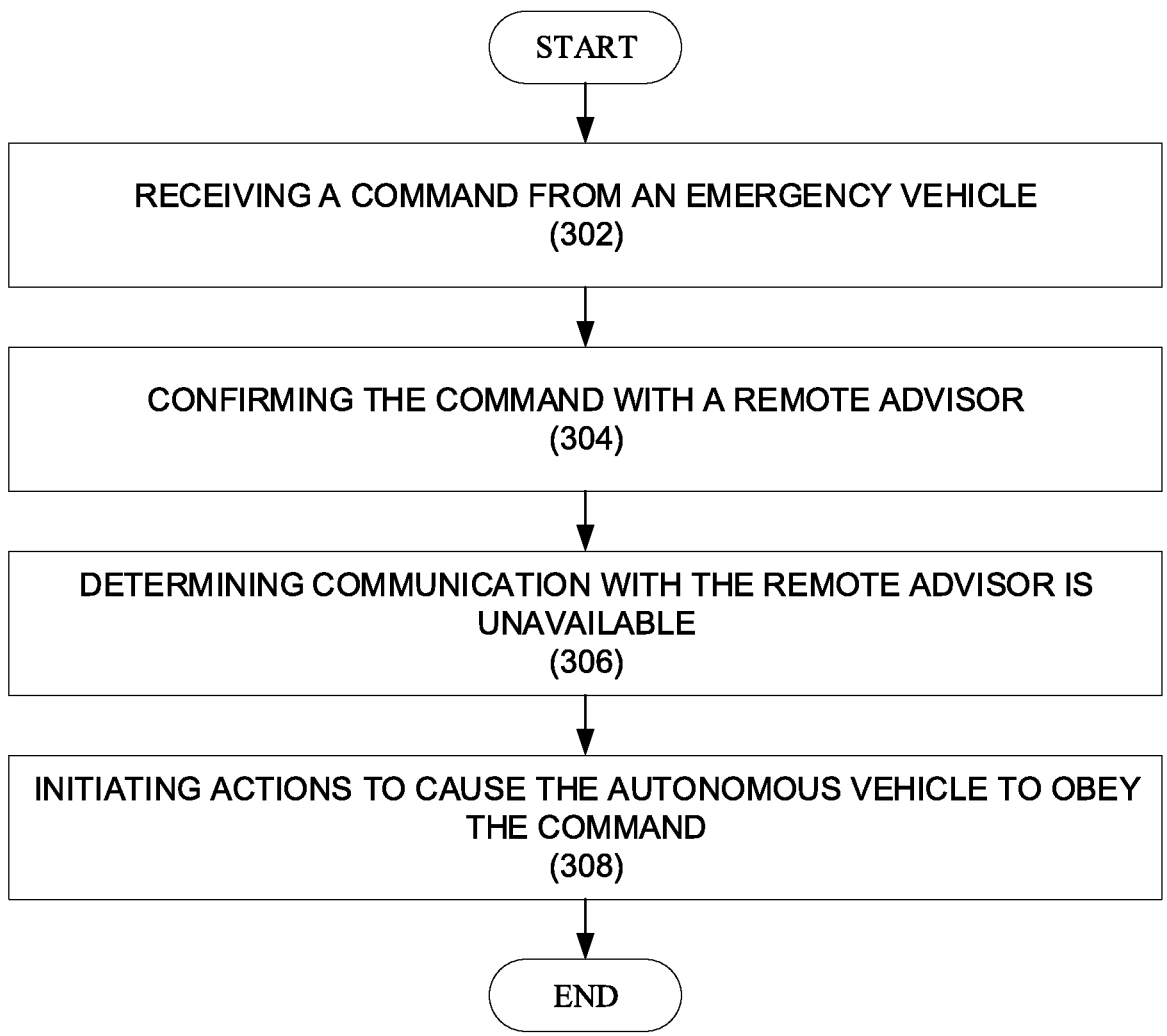
FIG. 3 shows an example method that an autonomous vehicle may implement to enable interaction with an emergency vehicle in accordance with some aspects of the present technology.

FIG. 3 shows an example method 300 that an autonomous vehicle 102 may implement to facilitate interactions with emergency vehicles. The example method 300 begins with the autonomous vehicle 102 receiving 302 a command from an emergency vehicle. More specifically, the communication service 116 of the internal computing system 110 receives 302 the command from the emergency vehicle. In some embodiments, the command may include a trusted token indicating that the command is sent from the emergency vehicle. Similarly, in some embodiments, the command may be received directly from the emergency vehicle. In other embodiments, the command may be received by way of relay through a remote assistance advisor and/or an emergency services advisor.

The internal computing system 110 then utilizes the communication service 116 to confirm 304 the command with the remote assistance advisor. To confirm 304 the command, the internal computing system 110 may send the command to the remote assistance advisor to authenticate and/or provide permission for the autonomous vehicle 102 to obey the command.

In some embodiments, the internal computing system 110 may determine 306 that communication between the communication service 116 and the remote assistance advisor is unavailable. For example, the internal computing system 110 may determine 306 that a response has not been received within a threshold amount of time. Similarly, the internal computing system 110 may determine 306 that there is no cellular connectivity and is thus unable to communicate with the remote assistance advisor.

In some embodiments, the internal computing system 110 may determine that communication between the communication service 116 and the remote assistance advisor is available. For example, the remote assistance advisor may return a confirmation message confirming that it has received data from the communication service 116. The internal computing system 110 may then receive authentication and/or permission for the autonomous vehicle 102 to obey the command.

The internal computing system 110 may then initiate 308 actions to cause the autonomous vehicle 102 to obey the command. More specifically, the internal computing system 110 may initiate 308 actions in response to determining that communication with the remote assistance advisor is unavailable and/or direct instructions from the remote assistance advisor to initiate 308 the actions.

In some embodiments, when communication is available with the remote assistance advisor, the internal computing system 110 may receive instructions that initiate 308 the actions to cause the autonomous vehicle 102 to obey the command.

Figure 4:
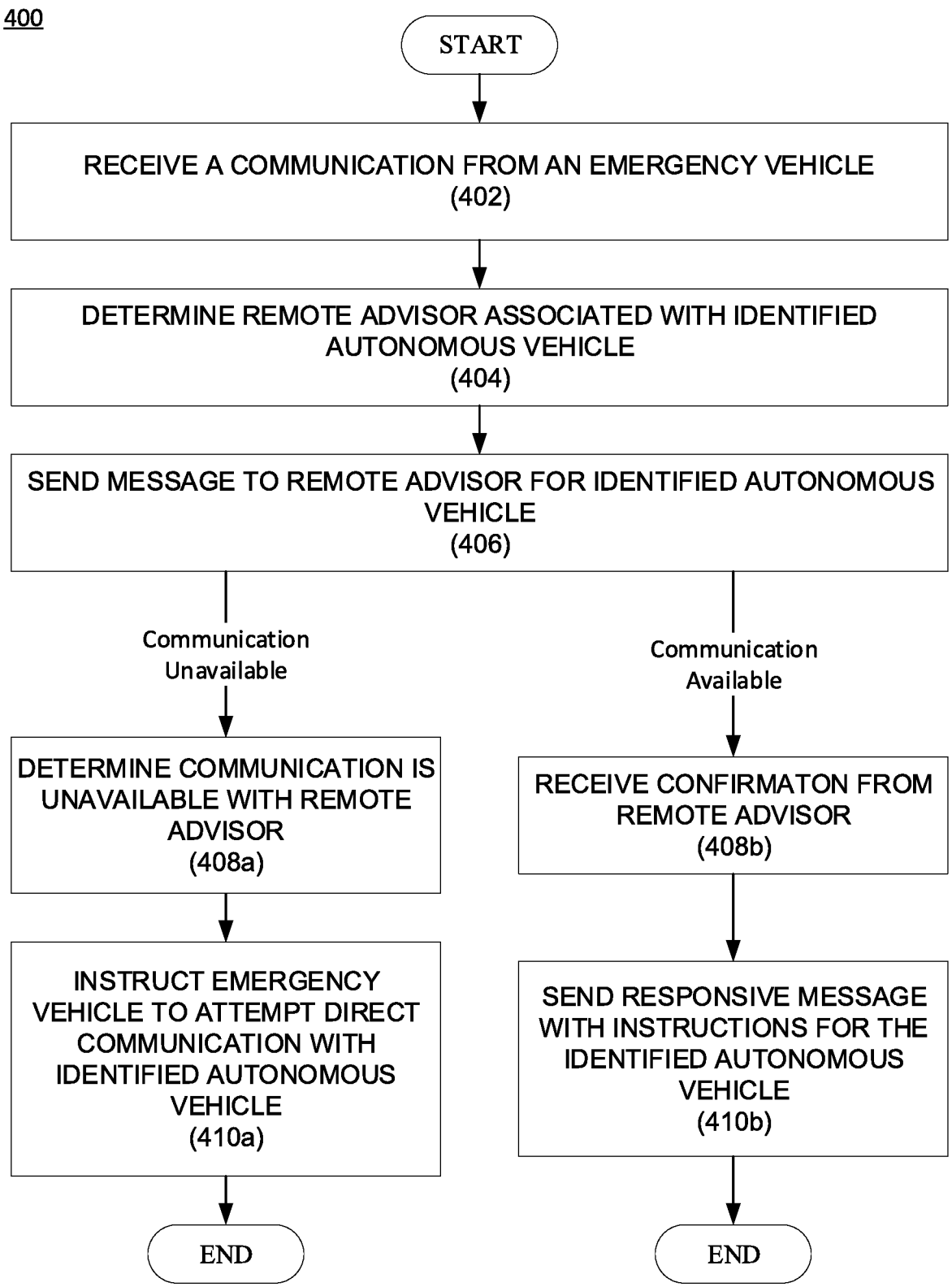
FIG. 4 shows an example method that an emergency services advisor may implement to enable interaction between an autonomous vehicle and an emergency vehicle in accordance with some aspects of the present technology.

FIG. 4 shows an example method 400 that an emergency services advisor may implement to enable interaction between an autonomous vehicle and an emergency vehicle. The example method 400 begins when the emergency services advisor receives 402 a communication from an emergency vehicle. The communication may include an identifier of an autonomous vehicle. For example, the identifier may be a license plate or a Vehicle Identification Number (VIN).

The emergency services advisor may then determine 404 a remote assistance advisor associated with the identified autonomous vehicle. For example, the emergency services advisor may input the identifier into a database to determine 404 which remote assistance advisor is associated with and/or owns the identified autonomous vehicle.

The emergency services advisor may then send 406 a message to the remote assistance advisor associated with the identified autonomous vehicle. The message may identify the identified autonomous vehicle, so that the remote assistance advisor may utilize the identifier to search for and connect to the identified autonomous vehicle. Thus, the identifier is particularly helpful when the identified autonomous vehicle is a part of a fleet of autonomous vehicles.

The emergency services advisor may then react in different ways according to different scenarios.

The emergency services advisor may determine 408a that communication is unavailable with the remote assistance advisor. In determining 408a this, the emergency services advisor may consider a variety of different factors including, but not limited to receiving a response that the remote assistance advisor is not currently available, not receiving a response for a threshold amount of time, receiving a response that the remote assistance advisor is not associated with the identified autonomous vehicle, etc.

Accordingly, the emergency services advisor may then instruct 410a the emergency vehicle to attempt direct communication with the identified autonomous vehicle.

In another scenario, the emergency services advisor may determine that communication is available with the remote assistance advisor. For example, the emergency services advisor may receive 408b confirmation from the remote assistance advisor that the identified autonomous vehicle is associated with the remote assistance advisor.

The emergency services advisor may then send 410b a responsive message with instructions for the identified autonomous vehicle. The responsive message may also include the identifier of the autonomous vehicle. Similarly, the responsive message may also include a chain of communication between the emergency services advisor and the emergency vehicle.

Figure 5:
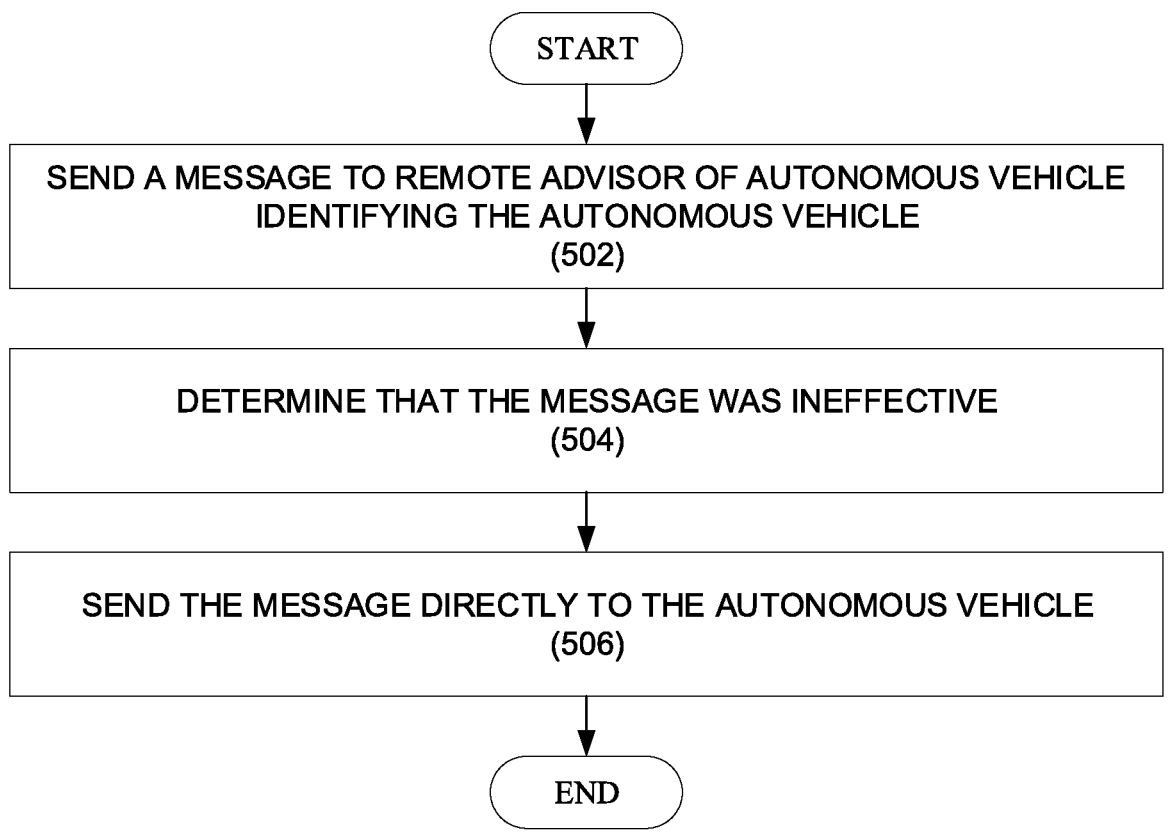
FIG. 5 shows an example method that an emergency vehicle may implement to communicate with an autonomous vehicle in accordance with some aspects of the present technology.

FIG. 5 shows an example method 500 that an emergency vehicle may implement to communicate with an autonomous vehicle. The example method 500 begins with the emergency vehicle sending 502 a message to an emergency services advisor and/or a remote assistance advisor of an autonomous vehicle. The message may include an identifier of the autonomous vehicle. For example, the identifier may be a license plate or a Vehicle Identification Number (VIN).

The emergency vehicle may then determine 504 that the message was ineffective. In determining that the message ineffective, the emergency vehicle may consider a wide variety of different factors including, but not limited to, a response from the emergency services advisor advising that communication with the autonomous vehicle and/or the remote assistance advisor was ineffective, not receiving a response within a threshold amount of time, weak cellular connectivity, etc.

The emergency vehicle may then send 506 the message directly to the autonomous vehicle. As discussed above, the sending 506 may occur over a wide variety of different forms of communication including, but not limited to, radio frequencies, Bluetooth, Near-Field Communications, cellular connectivity, etc.

Figure 6:
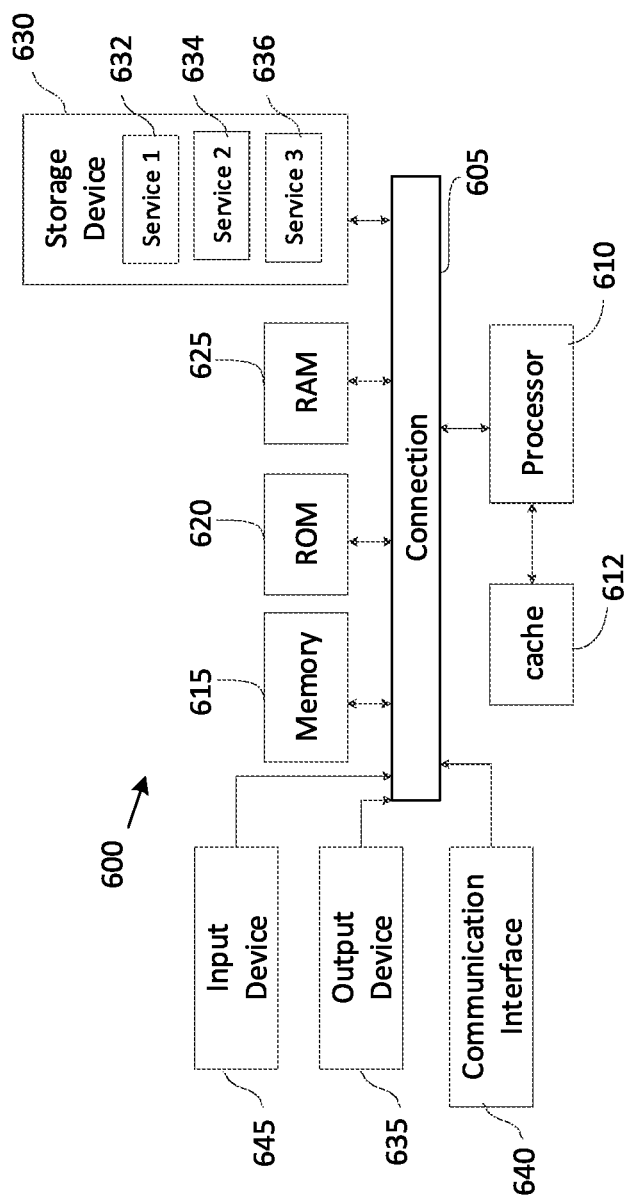
FIG. 6 shows an example of a system for implementing certain aspects of the present technology.

FIG. 6 shows an example of computing system 600, which can be for example any computing device making up internal computing system 110, remote computing system 150, (potential) passenger device executing rideshare app 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
    receiving, at an emergency services advisor, a command from an emergency vehicle, the command comprising a vehicle identifier for identifying an autonomous vehicle and one or more instructions specifying a desired action for the autonomous vehicle;
    relaying the command to a remote assistance advisor, via a private API, wherein the private API is configured to self-authenticate the emergency services advisor as a trusted source;
    identifying the autonomous vehicle based on the vehicle identifier;
    confirming, by the remote assistance advisor, the desired action specified by the command; and initiating, by the remote assistance advisor, actions to cause the autonomous vehicle to execute the desired action.

2. The computer-implemented method of claim 1, wherein the autonomous vehicle is configured to receive the command by way of relay through the remote assistance advisor and directly from the emergency vehicle.

3. The computer-implemented method of claim 1, wherein the command includes a trusted token indicating that the command is sent from the emergency vehicle.

4. An autonomous vehicle comprising:
   at least one processor; and
   at least one memory storing computer-readable instructions, the instructions effective to cause the at least one processor to:
      receive, at an emergency services advisor, a command from an emergency vehicle, the command comprising a vehicle identifier for identifying an autonomous vehicle and one or more instructions specifying a desired action for the autonomous vehicle;
      identify the autonomous vehicle based on the vehicle identifier;
      confirm, by the remote assistance advisor, the desired action specified by the command; and
      initiate, by the remote assistance advisor, actions to cause the autonomous vehicle to execute the desired action.

5. The autonomous vehicle of claim 4, wherein the autonomous vehicle is configured to receive the command by way of relay through the remote assistance advisor and directly from the emergency vehicle.

6. The autonomous vehicle of claim 4, wherein the command includes a trusted token indicating that the command is sent from the emergency vehicle.

7. A non-transitory computer-readable medium storing instructions thereon, the instructions effective to cause at least one processor to:
   receive, at an emergency services advisor, a command from an emergency vehicle, the command comprising a vehicle identifier for identifying an autonomous vehicle and one or more instructions specifying a desired action for the autonomous vehicle;
   identify the autonomous vehicle based on the vehicle identifier;
   confirm, by the remote assistance advisor, the desired action specified by the command; and
   initiate, by the remote assistance advisor, actions to cause the autonomous vehicle to execute the desired action.

8. The non-transitory computer-readable medium of claim 7, wherein the autonomous vehicle is configured to receive the command by way of relay through the remote assistance advisor and directly from the emergency vehicle.

\* \* \* \* \*